V. B. HAGG.
FILTER.
APPLICATION FILED JULY 20, 1914.
1,157,776.
Patented Oct. 26, 1915.
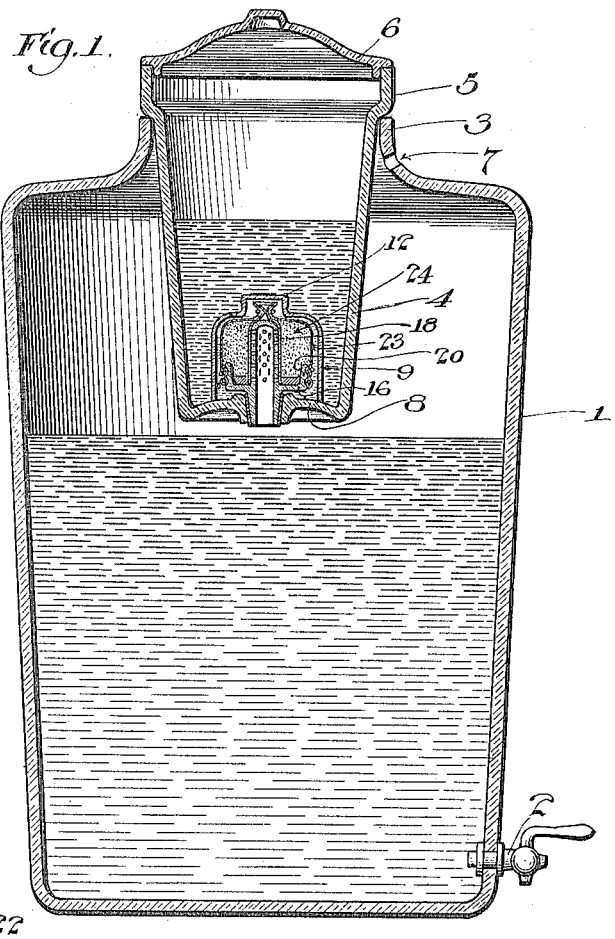
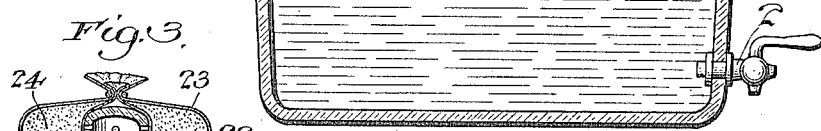
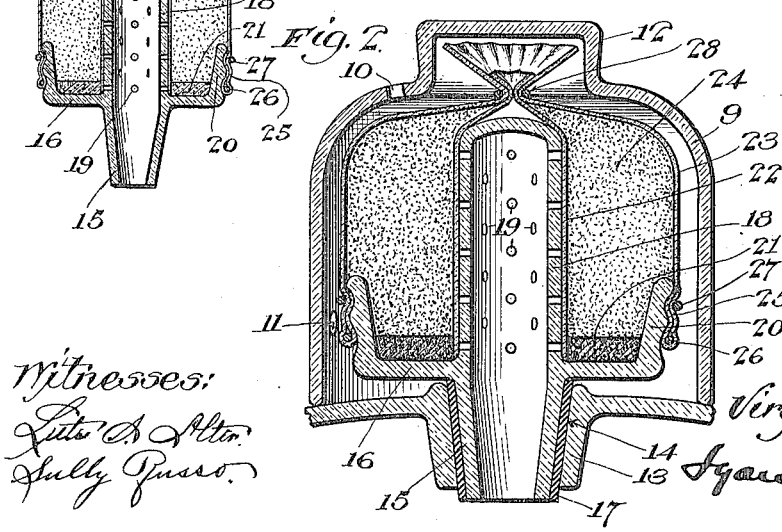
Witnesses:
Inventor:
Virgil B. Hagg.

UNITED STATES PATENT OFFICE.

VIRGIL B. HAGG, OF LOS ANGELES, CALIFORNIA.

FILTER.

1,157,776. Specification of Letters Patent. Patented Oct. 26, 1915.

Application filed July 20, 1914. Serial No. 851,857.

*To all whom it may concern:*

Be it known that I, VIRGIL B. HAGG, a citizen of the United States, residing at Los Angeles, in the county of Los Angeles and State of California, have invented a new and useful Filter, of which the following is a specification.

This invention relates to water filters, and one of the main objects is to so construct a filter that the filtering materials can be removed and new materials substituted with greater facility and economy than heretofore, the present invention enabling the change to be made in a few seconds' time.

Another object is to provide a more sanitary method of changing the filtering materials.

Another object is to provide a construction of such simplicity that no skill is required to change the materials, making it possible for a child to readily perform the operation of changing the filtering materials without the least chance of affecting the action of the purification process.

Another object is to so construct the filtering device that the materials can not be tampered with and endanger the action of purification, this being accomplished by sealing the filtering stopper.

Another object is to provide a construction which will prevent the coarse sediment in impure water choking up the filtering materials, and causing the purification action to cease.

Another object is to provide a construction whereby a larger quantity of water may be purified in a given length of time, this being accomplished by employing a vertical tubular member with perforated walls.

Referring to the drawings: Figure 1 is a vertical section through the filter. Fig. 2 is an enlarged sectional view through the filtering unit, its cover, and adjacent portion of the filter supporting chamber. Fig. 3 is a sectional view of the filter unit as removed from the filter.

1 designates the outer receptacle provided at its lower end with a faucet, and at its upper end with a flange 3, and removably supported in the upper end of the receptacle 1 is an inner receptacle 4, having a shoulder 5, which rests on the flange 3. The receptacle 4 has a removable cover 6. The water which is to be filtered is poured into the receptacle 4, and the filtering unit is contained within the receptacle 4 and is removable therefrom, when it is desired to replace the same with a clean unit. The upper end of the receptacle 1 has an air vent 7.

The bottom 8 of the inner receptacle 4 presents a convex surface on the inner side of the receptacle 4, and resting thereon is a protector 9 having a vent 10 and a water inlet 11. At the upper end the protector 9 has a dome 12, which forms an internal air port as will be described, and also serves as means whereby the cover 9 may readily be lifted.

The bottom 8 of the inner receptacle 5 has a flange 13, the bore of which forms a conical seat 14, and fitted therein is a conical lower end 15 of a filter unit base 16.

17 is a rubber gasket between the conical lower end 15 and seat 14 to prevent leakage.

The filter base 16 has an upwardly projecting tubular stem 18 with perforations 19, and has a corrugated flange 20. Resting on the base 15 within the flange 20 is a layer of mineral fiber 21, and encircling the stem 18 is a fabric of mineral fiber cloth 22. A layer of similar cloth 23 extends up from the flange 20 and incloses a body of finely divided filtering material 24. The outer cloth 23 is preferably secured by first laying its lower end portion 25 directly against the corrugated flange 20, and then wrapping asbestos twine 26 around the cloth to hold it firmly in the lower groove of the flange 20, and then the cloth is folded upwardly to cover the lower twine 26, and another similar twine 27 is tied around outside the cloth 23 to hold both layers in close engagement with the upper groove of the flange 20. The inner cloth 22 and outer cloth 23 are brought together at a point above the stem 18, and are tied with twine 28 in such a manner as to prevent entrance of water. The free portions of cloth 22 and 23 above the twine 28 extend into the dome 12.

In operation, the water which is to be filtered is poured into the inner receptacle 4, and flows through the perforation 11 into the interior of the cover 9 and thence percolates through the mineral fiber cloth 23 and through the filtering material 24, where it is purified, and then through the inner cloth 22 and through the perforations 19 to the interior of stem 18, from which it falls down into the outer receptacle 1, after having been purified in its passage through the filtering unit. When it is desired to clean the filter, the filtering unit is removed as a whole, and a clean one inserted in lieu thereof, the filtering unit which has been removed being taken to some convenient place and cleaned. This operation of removing the filtering unit and inserting a clean one takes but a few seconds' time, as it is only necessary to raise the cover 6, and then lift the cover 9 and grasp the flanged portion 20 of the filtering unit and withdraw the same from the conical seat 13, the taper of the interfering parts enabling their ready removal, and at the same time making it possible to secure a water tight joint by simply forcing a clean unit into place. After the filtering unit has been removed in the manner stated a clean unit is immediately inserted by simply forcing its conical end 15 into the rubber gasket 17, and then setting the cover 9 in place over it, and then replacing cover 6 after having filled the inner receptacle 4. It will, of course, be understood that before attempting to remove the filter unit, it is necessary to first pour out the water, if there is any in the inner receptacle 4, as otherwise it would pass directly through the conical seat 13 when the filter unit were removed and would contaminate the water already filtered. The water is readily poured out of the receptacle 4 by lifting the receptacle 4 out of its position in the receptacle 1.

It is to be noted that all of the filtering materials are completely inclosed in the filtering unit, and there is no liability of disarranging them during the process of removing the old unit, and inserting the new one. After the transfer has been made, it is an easy matter when the filter unit is removed to untie the twine to give access to the filtering material for the purpose of cleaning the same.

The main purpose of the cover 9 is to protect the filter unit when water is being poured into the inner receptacle 4. There is very little danger of the cloth covering 23 becoming loosened and disarranged when the water is poured into the inner receptacle 4, and what little danger there is is obviated by provision of the cover 9 which prevents the water from striking on the filter unit. The cover 9 defers the starting of the filtering operation to a slight extent but all liability of the cloth covering becoming loosened is obviated by the presence of the protecting cover. All liability of this, moreover, is obviated by the presence of the protecting cover 9. In the operation of filtering, the water in rising within the cover 9 pushes the air into the interior of the dome 12, which acts to prevent any water from forcing its way up inside the dome 12 and working down through the upper ends of the cloths 22 and 23.

One of the most important features of the invention is the upwardly projecting hollow stem 18, which presents a large area for the filtered water to pass through from the filtering material into the stem, which greatly increases the capacity of the filter. Where the filtering action is compelled to take place downwardly, the area is quite limited, but in the present case, the discharge area is much greater than would be the case if the filtering were to take place downwardly through the bottom of the filtering unit, and as the water passes horizontally radially into the stem, the impurities gradually work their way toward the bottom with a result that not all of the water is compelled to pass through all of the impurities, as is the case where filtration takes place in a downward direction. This construction thus greatly accelerates the filtering action, and also improves the quality of the filtering process and prolongs the period of service of a filter unit.

What I claim is:

1. In a filter, an outer receptacle, an inner receptacle supported therein, and a removable filter unit in the inner receptacle, said filter unit having a covering of fabric brought together and fastened at a point above the inner receptacle.

2. In a filter, an outer receptacle, an inner receptacle, a filter unit within the inner receptacle, comprising a base having a projection, the inner receptacle having a seat for receiving and fitting said projection, a filtering material supported on said base, and flexible permeable means secured to said base and completely inclosing said filtering material to hold the filtering material in place.

3. In a filter, an outer receptacle, an inner receptacle, a filter unit within the inner receptacle, comprising a base having a projection, the inner receptacle having a seat for receiving and fitting said projection, a filtering material supported on said base, flexible permeable means secured to said base and completely inclosing said filtering material to hold the filtering material in place, said base being formed with a hollow stem projecting up into the center of said filtering material, said stem being perforated to allow the passage of filtered water into the interior of the stem.

4. In a filter, an outer receptacle, an inner receptacle, a filter unit within the inner receptacle comprising a base having a projection, the inner receptacle having a seat for receiving and fitting said projection, a filtering material supported on said base, means secured to said base and completely inclosing said filtering material to hold the filtering material in place, and a removable covering in the inner receptacle inclosing the filter unit, said cover being provided with water inlet means.

5. In a filter, an outer receptacle, an inner receptacle, a filter unit within the inner receptacle, comprising a base having a projection, the inner receptacle having a seat for receiving and fitting said projection, a filtering material supported on said base, a fabric secured to said base and completely inclosing said filtering material to hold the filtering material in place, the bottom of said inner receptacle having a flange at said seat with a conical bore, a gasket in said bore, said projection being conical and fitting said gasket forming a water-tight joint and permitting immediate removal of the filter unit.

6. In a filter, an outer receptacle, an inner receptacle, the inner receptacle having a water passage forming a seat, a filter unit comprising a base, said base having a projection fitting in said seat, said base having an upwardly directed flange, a fabric with its lower portion secured to said flange, and the upper portion of said fabric being contracted and closed, said base having a hollow upwardly projecting perforated stem and filtering material within said fabric surrounding said stem.

7. In a filter, an outer receptacle, an inner receptacle, the inner receptacle having a water passage forming a seat, a filter unit comprising a base, said base having a projection fitting in said seat, said base having an upwardly directed flange, a fabric with its lower portion secured to said flange, and the upper portion of said fabric being contracted and closed, said base having a hollow upwardly projecting perforated stem and filtering material within said fabric surrounding said stem, a cover resting within said inner receptacle and completely inclosing said filter unit, said cover having water inlet means.

8. In a filter, an outer receptacle, an inner receptacle, the inner receptacle having a water passage forming a seat, a filter unit comprising a base, said base having a projection fitting in said seat, said base having an upwardly directed flange, a fabric with its lower portion secured to said flange, and the upper portion of said fabric being contracted and closed, said base having a hollow upwardly projecting perforated stem and filtering material within said fabric surrounding said stem, a cover resting within said inner receptacle and completely inclosing said filter unit, said cover having water inlet means, said cover having an air dome at the upper end thereof to prevent entrance of the water at the top of said fabric.

9. In a filter, an outer receptacle, an inner receptacle, with a water passage forming a seat, a filter unit comprising a base with a projection fitting in said seat, said base having an upwardly projecting flange outwardly corrugated, a fabric with its lower portion secured to said corrugated flange, said fabric extending upwardly and being closed at its top, said base having a hollow perforated stem extending upwardly, a fabric around said stem, and a suitable filtering material between said fabrics and supported by said base.

10. In a filter unit, a base, filtering material on the base, means inclosing said filtering material including an upwardly extended member with perforations to permit the passage of filtered water passing substantially in a horizontal direction therethrough and allowing the impurities in the filtering material to descend to the bottom of the filtering material, and including a covering of fabric surrounding the filtering material to hold said material in place.

11. In combination, a base, filtering material on the base, fabric extending up from the base and surrounding the filtering material to hold said material in place on the base, said fabric having an opening at its top, and means to hold the fabric together to close said opening.

In testimony whereof, I have hereunto set my hand at Los Angeles, California, this 1st day of July 1914.

VIRGIL B. HAGG.

In presence of—
 LORA M. BOWERS,
 LORRAINE E. DURROW.

Copies of this patent may be obtained for five cents each, by addressing the "Commissioner of Patents, Washington, D. C."